United States Patent
Perkins et al.

(10) Patent No.: US 9,546,672 B2
(45) Date of Patent: Jan. 17, 2017

(54) ACTUATOR LIMIT CONTROLLER

(71) Applicant: Google Inc., Mountain View, CA (US)

(72) Inventors: Alex Perkins, Arlington, MA (US); Kevin Blankespoor, Arlington, MA (US); Alfred Rizzi, Belmont, MA (US)

(73) Assignee: Google Inc., Mountain View, CA (US)

( * ) Notice: Subject to any disclaimer, the term of this patent is extended or adjusted under 35 U.S.C. 154(b) by 365 days.

(21) Appl. No.: 14/489,778

(22) Filed: Sep. 18, 2014

(65) Prior Publication Data

US 2016/0025114 A1     Jan. 28, 2016

Related U.S. Application Data

(60) Provisional application No. 62/028,546, filed on Jul. 24, 2014.

(51) Int. Cl.
   *F15B 9/09*      (2006.01)
   *F15B 13/02*     (2006.01)
   *F15B 21/08*     (2006.01)
   *F15B 15/28*     (2006.01)
   *F15B 11/048*    (2006.01)

(52) U.S. Cl.
   CPC ............... *F15B 13/021* (2013.01); *F15B 9/09* (2013.01); *F15B 11/048* (2013.01); *F15B 15/28* (2013.01); *F15B 21/08* (2013.01); *F15B 2211/6336* (2013.01); *F15B 2211/665* (2013.01); *F15B 2211/7053* (2013.01); *F15B 2211/755* (2013.01); *F15B 2211/7653* (2013.01)

(58) Field of Classification Search
   CPC ......... F15B 9/09; F15B 11/046; F15B 11/048; F15B 15/22; F15B 15/28; F15B 21/08
   See application file for complete search history.

(56) References Cited

U.S. PATENT DOCUMENTS

| | | |
|---|---|---|
| 4,358,989 A | 11/1982 | Tordenmalm |
| 4,666,374 A | 5/1987 | Nelson |
| 4,889,036 A | 12/1989 | Yoshikawa et al. |

(Continued)

OTHER PUBLICATIONS

International Search Report issued in connection with co-pending International Application No. PCT/US2015/030290, ISA/KR Korean Intellectual Property Office, dated Jan. 14, 2016, 5 pages.

(Continued)

*Primary Examiner* — Michael Leslie
(74) *Attorney, Agent, or Firm* — McDonnell Boehnen Hulbert & Berghoff LLP

(57) ABSTRACT

In some applications, a piston of a hydraulic actuator may move at high speeds, and large undesired forces may be generated if the piston reaches an end-stop of the hydraulic actuator at a high speed. The undesired forces may, for example, cause mechanical damage in the hydraulic actuator. A controller may receive information indicative of the piston reaching a first position at a first threshold distance from the end-stop, and, in response, may modify a signal to a valve assembly controlling flow of hydraulic fluid to and from the hydraulic actuator. Further, the controller may receive information indicative of the piston reaching a second position at a second threshold distance closer to the end-stop of the hydraulic actuator, and, in response, the controller may further modify the signal to the valve assembly so as to apply a force on the piston in a away from the end-stop.

20 Claims, 9 Drawing Sheets

(56) References Cited

U.S. PATENT DOCUMENTS

| | | | |
|---|---|---|---|
| 4,896,582 A * | 1/1990 | Tordenmalm | F15B 11/048 91/361 |
| 6,129,001 A | 10/2000 | Harju | |
| 6,705,199 B2 | 3/2004 | Liao et al. | |
| 7,076,314 B2 | 7/2006 | Saitou | |
| 7,387,061 B2 * | 6/2008 | Kobata | F15B 11/048 60/461 |
| 7,493,826 B2 | 2/2009 | Bohr et al. | |
| 8,225,706 B2 | 7/2012 | Vigholm et al. | |
| 8,453,441 B2 | 6/2013 | Williamson et al. | |
| 2003/0213360 A1 | 11/2003 | Akita | |
| 2004/0200349 A1 | 10/2004 | Moler et al. | |
| 2008/0228323 A1 | 9/2008 | Laumer et al. | |

OTHER PUBLICATIONS

Written Opinion issued in connection with co-pending International Patent Application No. PCT/US2015/030290, ISA/KR Korean Intellectual Property Office, dated Jan. 14, 2016, 10 pages.

* cited by examiner

ACTUATOR LIMIT CONTROLLER

CROSS REFERENCE TO RELATED APPLICATION

The present application claims priority to U.S. Provisional patent application Ser. No. 62/028,546, filed on Jul. 24, 2014, and entitled "Position-Force Control of an Actuator," which is herein incorporated by reference as if fully set forth in this description.

GOVERNMENT RIGHTS

This invention was made with U.S. Government support under Contract No. HR00011-10-C-0025 awarded by DARPA. The Government may have certain rights with regard to the invention.

BACKGROUND

Hydraulic systems may include an actuator that is powered by hydraulic fluid supplied from a hydraulic fluid source, such as a pump. A valve can be used to control hydraulic fluid flow to and from the actuator. For instance, the valve can control flow from the pump to the actuator and flow from the actuator to a tank or reservoir. The valve is controlled to vary the resistance to flow so as to control speed and direction of motion of the actuator.

SUMMARY

The present disclosure describes embodiments that relate to position-force control of an actuator. In one aspect, the present disclosure describes a method. The method includes receiving, at a controller, a command for moving a piston of a hydraulic actuator at a given speed in a given direction. The hydraulic actuator includes a first chamber and a second chamber. A valve assembly couples a source of pressurized hydraulic fluid to the first chamber and couples the second chamber to a return line. The method also includes, based on the command, the controller providing a signal to operate the valve assembly to provide the pressurized hydraulic fluid to the first chamber and allow hydraulic fluid in the second chamber to flow from the second chamber to the return line so as to cause motion of the piston at the given speed in the given direction. The method further includes receiving position information indicative of the piston reaching a first position at a first threshold distance from an end-stop of the hydraulic actuator, and, in response, modifying the signal to the valve assembly so as to reduce a speed of the piston. The method also includes receiving position information indicative of the piston reaching a second position at a second threshold distance closer to the end-stop of the hydraulic actuator, and, in response, further modifying the signal to the valve assembly to cause the hydraulic fluid in the second chamber to apply a force on the piston in a direction away from the end-stop.

In another aspect, the present disclosure describes a non-transitory computer readable medium having stored thereon executable instructions that, upon execution by a controller, cause the controller to perform functions. The functions include receiving a command for moving a piston of a hydraulic actuator at a given speed in a given direction. The hydraulic actuator includes a first chamber and a second chamber. The functions also include, based on the command, providing a signal to operate a valve assembly that controls flow of hydraulic fluid to the first chamber and controls flow of hydraulic fluid out of the second chamber so as to cause motion of the piston at the given speed in the given direction. The functions further include receiving position information indicative of the piston reaching a first position at a first threshold distance from an end-stop of the hydraulic actuator, and, in response, making a first modification to the signal to the valve assembly so as to reduce a speed of the piston. The functions also include receiving position information indicative of the piston reaching a second position at a second threshold distance closer to the end-stop of the hydraulic actuator, and, in response, making a second modification to the signal to the valve assembly to cause the hydraulic fluid within the second chamber to apply a force on the piston in a direction away from the end-stop.

In still another aspect, the present disclosure describes a system. The system includes a source of pressurized hydraulic fluid; a return line; and a hydraulic actuator cylinder. The hydraulic actuator cylinder has a piston slidably accommodated in the hydraulic actuator cylinder, the piston including a piston head and a rod extending from the piston head along a central axis direction, the inside of the hydraulic actuator cylinder being divided into a first chamber and a second chamber by the piston head. The system also includes a valve assembly that couples the source of pressurized hydraulic fluid to the first chamber and couples the second chamber to the return line. The system further includes at least one processor, and a memory having stored thereon executable instructions that, upon execution by the at least one processor, cause the at least one processor to perform functions. The functions comprise receiving a command for moving the piston at a given speed in a given direction. The functions also include, based on the command, providing a signal to operate the valve assembly to provide the pressurized hydraulic fluid to the first chamber and allow hydraulic fluid in the second chamber to flow from the second chamber to the return line so as to cause motion of the piston at the given speed in the given direction. The functions further include receiving position information indicative of the piston reaching a first position at a first threshold distance from an end-stop of the hydraulic actuator cylinder, and, in response, making a first modification to the signal to the valve assembly so as to apply a first force on the piston in a direction away from the end-stop so as to reduce a speed of the piston. The functions also include receiving position information indicative of the piston reaching a second position at a second threshold distance closer to the end-stop of the hydraulic actuator cylinder, and, in response, making a second modification to the signal to the valve assembly so as to apply a second force on the piston in the direction away from the end-stop so as to further reduce the speed of the piston.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

I. Overview

A hydraulic valve can be an electrically operated valve that controls how hydraulic fluid is ported to a hydraulic actuator. Such valves may be operated by transforming a changing analogue or digital input signal into a smooth set of movements in a hydraulic actuator.

Figure 1:
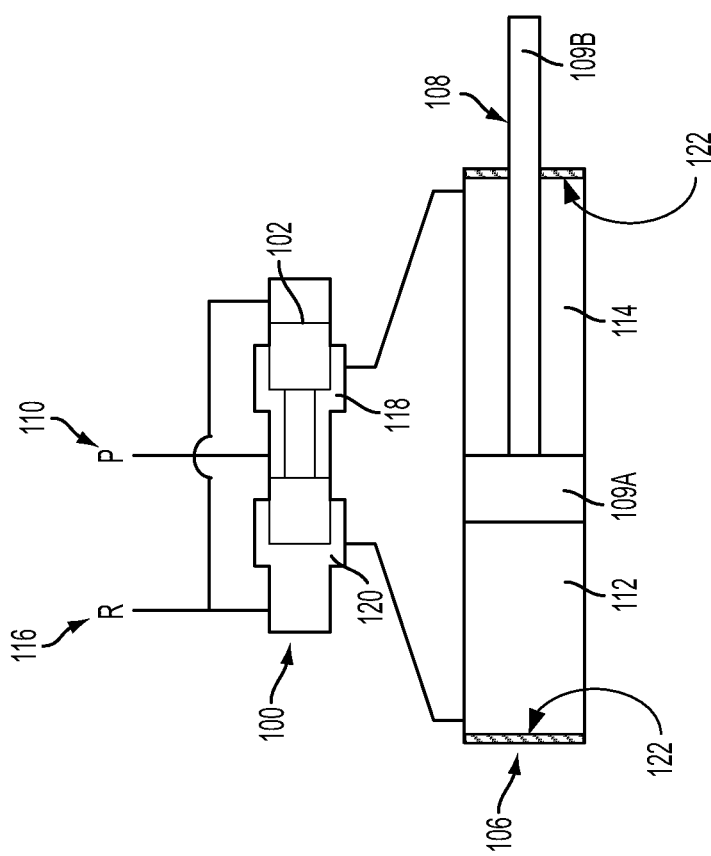
FIG. 1 illustrates a hydraulic circuit including a valve having a spool configured to move linearly, in accordance with an example embodiment.

FIG. 1 illustrates a hydraulic circuit including a valve 100 having a spool 102 configured to move linearly, in accordance with an example embodiment. FIG. 1 depicts the valve 100 controlling flow to and from a hydraulic actuator (or cylinder) 106 so as to control motion of a piston 108 of the hydraulic actuator 106. The piston 108 is slidably accommodated in the hydraulic actuator 106, the piston including a piston head 109A and a rod 109B extending from the piston head 109A along a central axis direction. Thus, the inside of the hydraulic actuator 106 is divided into a first chamber 112 and a second chamber 114 by the piston head 109A.

Axial position of the spool 102 controls flow from a pressure source 110 through a supply line to one of the two chambers 112 and 114 of the hydraulic actuator 106, and controls flow of fluid forced out from the other chamber to a low pressure reservoir or tank 116. For instance, as shown in FIG. 1, the spool 102 is shifted to a given linear position so as to allow flow from the pressure source 110 through opening 118 to the chamber 114, and allow fluid forced out from the chamber 112 through opening 120 to flow through a return line to the reservoir 116. An electric solenoid, a stepper motor, a hydraulic actuator, or any other actuation device may be used for moving the spool 102.

Thus, in response to moving the spool 102 to the position shown in FIG. 1, the piston 108 may move (to the left). Respective sizes of the openings 118 and 120 depend on the axial position of the spool 102, i.e., the axial position the spool 102 determines an amount of flow through the valve 100 and the degree of restriction that the flow is subjected to while passing through the valve 100. In this manner, the axial position of the spool 102 affects/controls the speed of motion of the piston 108.

In some example applications, the piston 108 may be configured to move at high speeds. When the piston 108 operates at a high speed, large forces may be created if the piston 108 suddenly comes to a stop, e.g., reach an end-stop 122 of the hydraulic actuator 106, or changes direction of motion. These forces can be large, and can result in large stresses within mechanical components leading to breakage, failure, or accelerated wear of components, or can result in pressure spikes in hydraulic components leading to breakage and failure of components.

In some examples, slowing down the piston 108 before reaching the end-stop 122 of the hydraulic actuator 106 may reduce the stress and negative effects on the hydraulic system. As an example, a controller of the hydraulic actuator 106 may receive a command to cause the piston 108 to move at a given speed in a given direction. In response to the command, the controller may be configured to send a signal to the pressure source 110 and the valve 100 so as to cause the piston 108 to move at the commanded speed. The controller may implement a closed loop feedback velocity control where a sensor provides information associated with speed of the piston 108 to the controller, and the controller provides signals to the valve 100 based on the velocity feedback to maintain the commanded speed.

Normal operation at the commanded speed may continue until, for example, the piston head 109A reaches a first position that is at a first threshold distance from the end-stop 122 of the hydraulic actuator 106. Upon reaching the first position, the controller may modify, supplement, or override the speed command to dampen the motion of the piston 108 and slow it down. The first position and the first threshold distance may be based on a size and stroke length (e.g., distance that the piston 108 travels from one end of the hydraulic actuator 106 to the other end) of the hydraulic actuator 106. For example, if the stroke is 80 millimeters (mm), the first threshold distance may be 6 mm, such that when the piston 108 is 6 mm away from the end-stop 122, the controller may modify the command to the valve 100 to slow down the piston 108. As another example, if the stroke is 45 mm, the first threshold distance may be 6 mm.

Operating in the dampened mode (e.g., operating the piston 108 at the reduced speed) may continue until the piston head 109A reaches a second position closer to, and at a second threshold distance from, the end-stop 122. For example, if the stroke is 80 mm or 45 mm, the second threshold distance may be 4 mm. These numbers are examples for illustration only, and other threshold distances are contemplated based on type of application in which the actuator is used and stroke length.

Upon the piston head 109A reaching the second position (e.g., 4 mm away from the end-stop 122), the controller may further modify the signal to the valve 100 so as to cause hydraulic fluid in the contracting chamber 112 to apply a force on the piston 108 in a direction away from the end-stop 122. The applied force may be a spring-like force (i.e., as if a spring is pushing against the piston 108) and may be based on how close the piston is to the end-stop 122. In this manner, the piston 108 may slow down further and the controller may prevent any shock forces to occur as the piston 108 reaches the end-stop 122.

II. Example Hydraulic Actuator Control System

Figure 2:
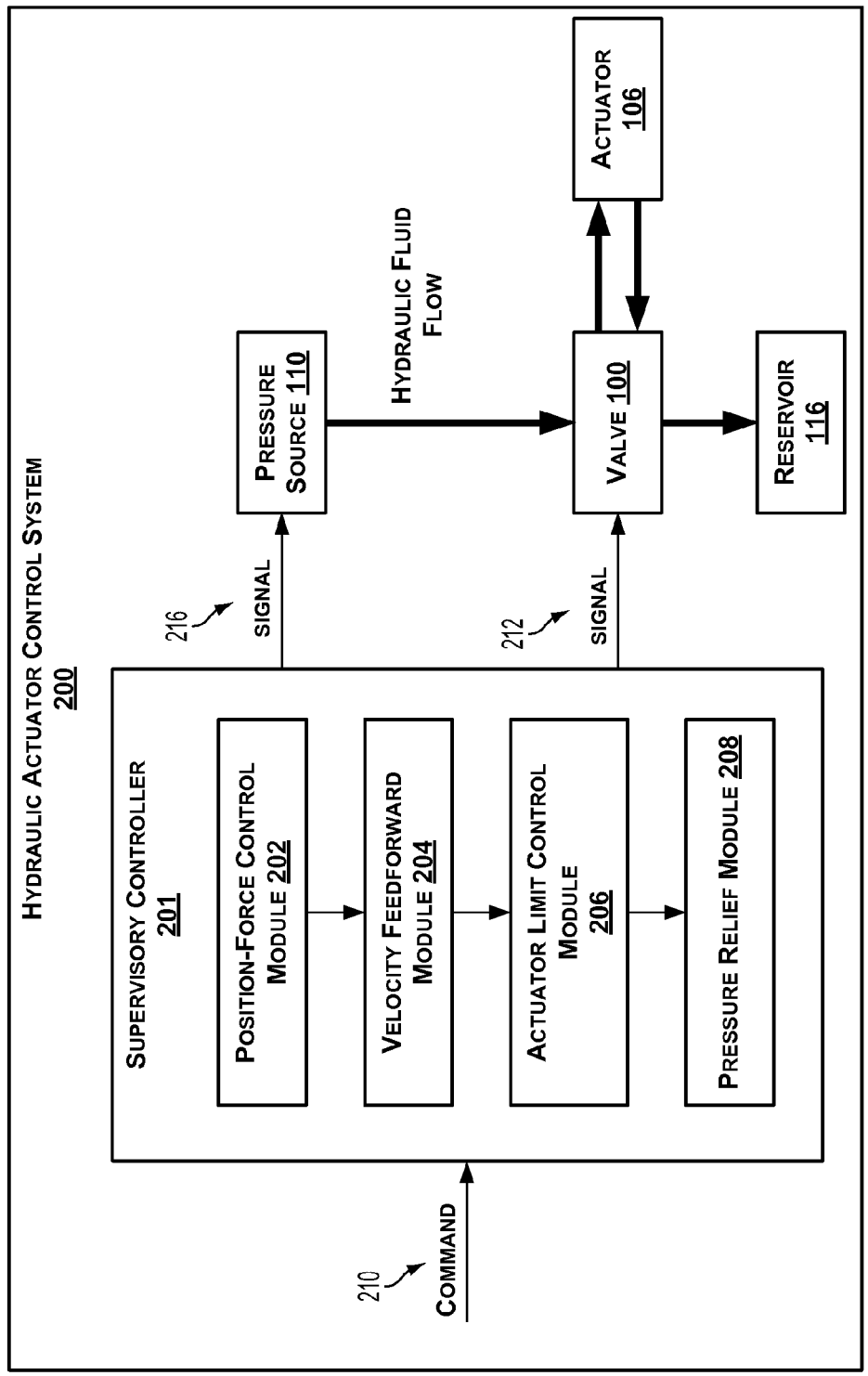
FIG. 2 illustrates a block diagram of an example hydraulic actuator control system, in accordance with an example embodiment.

FIG. 2 illustrates a block diagram of an example hydraulic actuator control system 200, in accordance with an embodiment. The system 200 includes a supervisory controller 201. The supervisory controller 201 includes a position-force control module 202, a velocity feedforward module 204 in communication with the position-force control module 202, an actuator limit control module 206 in communication with the velocity feedforward module 204, a pressure relief module 208 in communication with the actuator limit control module 206. In examples, the modules 202, 204, 206, and 208 may all be in communication with each other. For instance, the velocity feedforward module 204, the actuator limit control module 206, and the pressure relief module 208 may be in communication with the position-force control module 202.

The supervisory controller 201 may be configured to receive a command 210 for moving the piston 108 of the hydraulic actuator 106 at a given speed in a given direction. Based on the command, the supervisory controller 201 provides a signal 212 to operate the valve 100. In examples, the supervisory controller 201 may also provide a signal 216 to operate the pressure source 110 to provide pressurized hydraulic fluid (e.g., provide a particular amount of flow at a particular pressure) to the valve 100. The valve 100, based on the signal 212, is actuated to provide hydraulic fluid flow to the hydraulic actuator 106. The valve 100 therefore controls flow from the pressure source 110 to the hydraulic actuator 106 (e.g., through the opening 118) and flow from the hydraulic actuator 106 to the tank or reservoir 116 (e.g., through the opening 120). Specifically, the signal to the valve 100 may determine a position of the spool 102. The position of the spool determines respective sizes of the openings 118 and 120. The flow through either the opening 118 or 120 can be determined by the following equation:

$$\text{Flow}(Q) = K\sqrt{\Delta P} \qquad (1)$$

Where Q is flow through a given opening (i.e., the opening 118 or the opening 120), K is a variable that depends on a size of the given opening and $\Delta P$ is a pressure difference across the given opening (i.e., pressure of hydraulic fluid after flowing through the given opening subtracted from pressure of hydraulic fluid before flow through the given opening). The signal provided to the valve 100 defines a position of the spool 102, and accordingly defines sizes of the openings 118 and 120 and the variable K for each opening, i.e., there is a direct relationship between the signal provided to the valve 100 and the variable K. Thus, the signal to the valve 100 determines an amount of flow across the openings 118 and 120. In an example, in pressure compensated valves, $\Delta P$, across a given opening can be kept constant, and in this manner there is a linear or proportional relationship between the signal provided to the valve 100 (i.e., the variable K) and the amount of flow across the given opening. Thus, the supervisory controller 201 receives a command to move the piston 108 at a given speed in a given direction, and determines the signal to provide to the valve 100 to define the sizes of the openings 118 and 120, accordingly.

The position-force control module 202 may be configured to implement closed-loop feedback control so as to control position and velocity of the piston 108. The position-force control module 202 may also be configured to implement closed-loop feedback control so as to control a force applied by the piston 108 on an external environment. Details of the position-force control module are described below at FIG. 3.

The velocity feedforward module 204 may be configured to provide an output to the valve 100 that is based on a velocity feedforward control structure. For instance, if the actuator is operating in a force control mode, the velocity feedforward module 204 may provide an output signal that opens the valve 100 to allow flow with either resistance (if braking is desired) or assistance (if positive work is desired) based on a velocity estimate and a desired force. In another example, if the actuator is operating in a position control mode, the velocity feedforward module 204 may be configured to set a feedforward command for the valve 100 based on a desired velocity and force and a model of the hydraulic actuator 106.

The actuator limit control module 206 may be configured to modify or override commands from other modules to reduce or prevent impact when the piston 108 is close to a physical limit, i.e., the piston 108 is close to the end-stop 122.

The pressure relief module 208 may be configured to detect, via a pressure sensor for example, a dangerously high pressure level is in one or both chambers 112 and 114 of the hydraulic actuator 106. In response, the pressure relief module 208 may modify or override a command to the valve 100 to vent pressure and prevent damage.

Thus, the position-force control module 202 may be configured to determine a signal to control the valve 100 based on the command 210, and the signal may be modified by one or more of the velocity feedforward module 204, the actuator limit control module 206, and the pressure relief module 208 to generate the signal 212 to the valve 100. The supervisory controller 201 may be configured to determine priorities of the hydraulic actuator control system 200 and assign weights to each of the modules 204, 206, and 208. In an example, the prioritization may be based on safety or performance requirements for a particular hydraulic system. For instance, if preventing the piston 108 of the hydraulic actuator 106 from hitting the end-stop 122 at a high speed has a higher priority than responding to an increase in pressure in one of the chambers 112 and 114 beyond a threshold value for a given amount of time, then the modification by the actuator limit control module 206 may be assigned a larger weight in modifying the signal generated by the position-force control module 202 than the pressure relief module 208.

In this manner, based on the prioritization, the supervisory controller 201 may provide the signal 212 to the valve 100 (and possibly the signal 216 to the pressure source 110) to actuate the piston 108 while taking factors such as mode of operation of the hydraulic actuator 106, sudden increases in pressure levels, closeness to the end-stop 122, etc., into consideration.

Components of the system 200 may be configured to work in an interconnected fashion with each other and/or with other components coupled to respective systems. One or more of the described functions or components of the supervisory controller 201 may be divided up into additional functional or physical components, or combined into fewer functional or physical components. In some further examples, additional functional and/or physical components may be added to the examples illustrated by FIG. 2. Still further, any of the position-force control module 202, the velocity feedforward module 204, the actuator limit control module 206, and the pressure relief module 208 may include or be provided in the form of a processor (e.g., a microprocessor, a digital signal processor (DSP), etc.) configured to execute program code including one or more instructions for implementing logical functions described herein. The supervisory controller 201 may further include any type of computer readable medium (non-transitory medium) or memory, for example, such as a storage device including a disk or hard drive, to store the program code. In an example, the system 200 may be included within other systems.

III. Example Position-Force Control System

Figure 3:
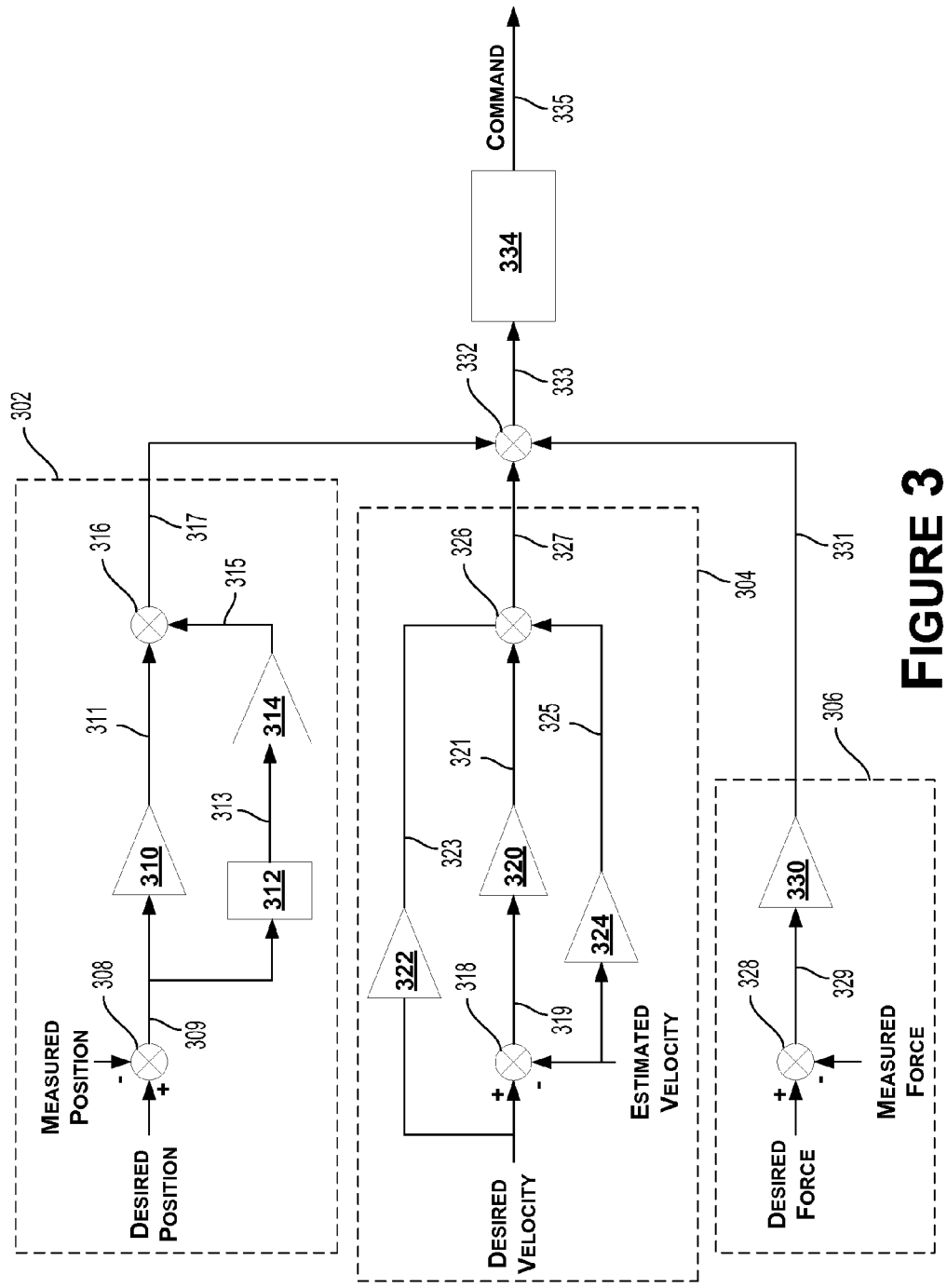
FIG. 3 illustrates a position-force control system, in accordance with an example embodiment.

FIG. 3 illustrates a position-force control system 300, in accordance with an example embodiment. The position-force control system 300 may, for example, be implemented by the position-force control module 202 described in FIG. 2. As FIG. 3 shows, the position-force controls system 300 may include three control loops, a position control loop 302, a velocity control loop 304, and a force control loop 306.

The position control loop 302 is configured to generate a command based on a difference between a desired position for the piston 108 of the hydraulic actuator 106 and a measured position of the piston 108. For instance, a position sensor may be coupled to the piston 108 (e.g., coupled to the piston head 109A or the rod 109B) and may be configured to provide information indicative of a position of the piston 108 to the supervisory controller 201. The difference is determined at junction 308 and represents a position error 309. The position error 309 is gain adjusted by a proportional gain 310 to form an adjusted signal 311. Also, the position error 309 is integrated at block 312 to form integrated error signal 313, which is gain adjusted by a proportional gain 314 to form an adjusted signal 315. The signal 311 and the signal 314 are summed at summation junction 316 to form signal 317.

The velocity control loop 304 is configured to generate a command based on a difference between a desired velocity for the piston 108 and a measured or estimated velocity of the piston 108. In an example, a velocity sensor may be coupled to the piston 108 (e.g., coupled to the piston head 109A or the rod 109B) and may be configured to provide information indicative of a velocity of the piston 108 to the supervisory controller 201. In another example, the supervisory controller 201 may be configured to estimate the velocity of the piston 108 by differentiating the measured position of the piston 108 obtained from the position sensor coupled of the piston 108. The velocity difference is determined at junction 318 and represents a velocity error 319. The velocity error 319 is gain adjusted by a proportional gain 320 to form an adjusted signal 321. Also, the desired velocity is gain adjusted by a feedforward gain 322 to form signal 323. The estimated velocity is gain adjusted by a proportional gain 324 to form an adjusted signal 325. The signal 321, the signal 323, and the signal 325 are summed at summation junction 326 to form signal 327.

The force control loop 306 is configured to generate a command based on a difference between a desired force to be applied by the piston 108 to an external environment and a measured force of the piston 108. In an example, a force sensor (e.g., load cell) may be coupled to an end of the rod 109B and may be configured to provide information indicative of a force experienced by the piston 108 to the supervisory controller 201. The force experienced by the piston 108 is indicative of (i.e., a reaction to) the force applied by the piston 108 to the external environment. In another example, pressure sensors may be coupled to the chambers 112 and 114 of the hydraulic actuator 106. The supervisory controller 201 or the position-force control module 202 may be configured to determine the force applied by the piston 108 based on information received from the pressure sensors. For example, assuming that the pressure in the chamber 112 is $P_C$, the pressure in the chamber 114 is $P_R$, an area of the piston head 109A is $A_C$, and a cross section area of the rod 109B is $A_{rod}$, the force applied by the piston 108 assuming the piston 108 is retracting (i.e., the chamber 112 is contracting and the chamber 114 is expanding) can be estimated by the following equation:

$$\text{Force}=P_R(A_C-A_{rod})-P_C A_C \qquad (2)$$

where $A_C-A_{rod}$ represents an annulus area of the piston 108 in the chamber 114. If the piston 108 is extending (i.e., the chamber 112 is contracting and the chamber 114 is expanding), the force applied by the piston to the external environment can be estimated by the following equation:

$$\text{Force}=P_C A_C-P_R(A_C-A_{rod}) \qquad (3)$$

The force difference is determined at junction 328 and represents a force error 329. The force error 329 is gain adjusted by a proportional gain 330 to form an adjusted signal 331.

The signal 331 generated by the force control loop 306, the signal 327 generated by the velocity control loop 304, and the signal 317 generated by the position control loop 302 are summed at summation junction 332 to form signal 333. The signal 333 may be limited by a slew rate limiter block 334, which defines a maximum rate of change for the signal 333. The slew rate limiter block 334 may thus prevent sudden changes to the signal sent to the valve 100. In this manner, motion of the piston 108 may be smooth and may not exhibit jerky behavior. If the rate of change of the signal 333 does not exceed the maximum rate of change defined by the slew rate limiter block 334, the signal 333 is not modified by the slew rate limiter block 334. Command 335 may thus be the same as the signal 333 or may represent a modification of the signal 333 by the slew rate limiter block 334.

The control loops 302, 304, and 306 are examples for illustration only, and other control strategies may be implemented to provide a signal to the valve 100 and control the hydraulic actuator 106. Further, in some examples, not all the components of the control structure illustrated in FIG. 3 may be active at a given point in time. Based on a condition of the hydraulic actuator 106 and condition of an object controlled by the hydraulic actuator 106, some components may be active and others may not be active.

Figure 4:
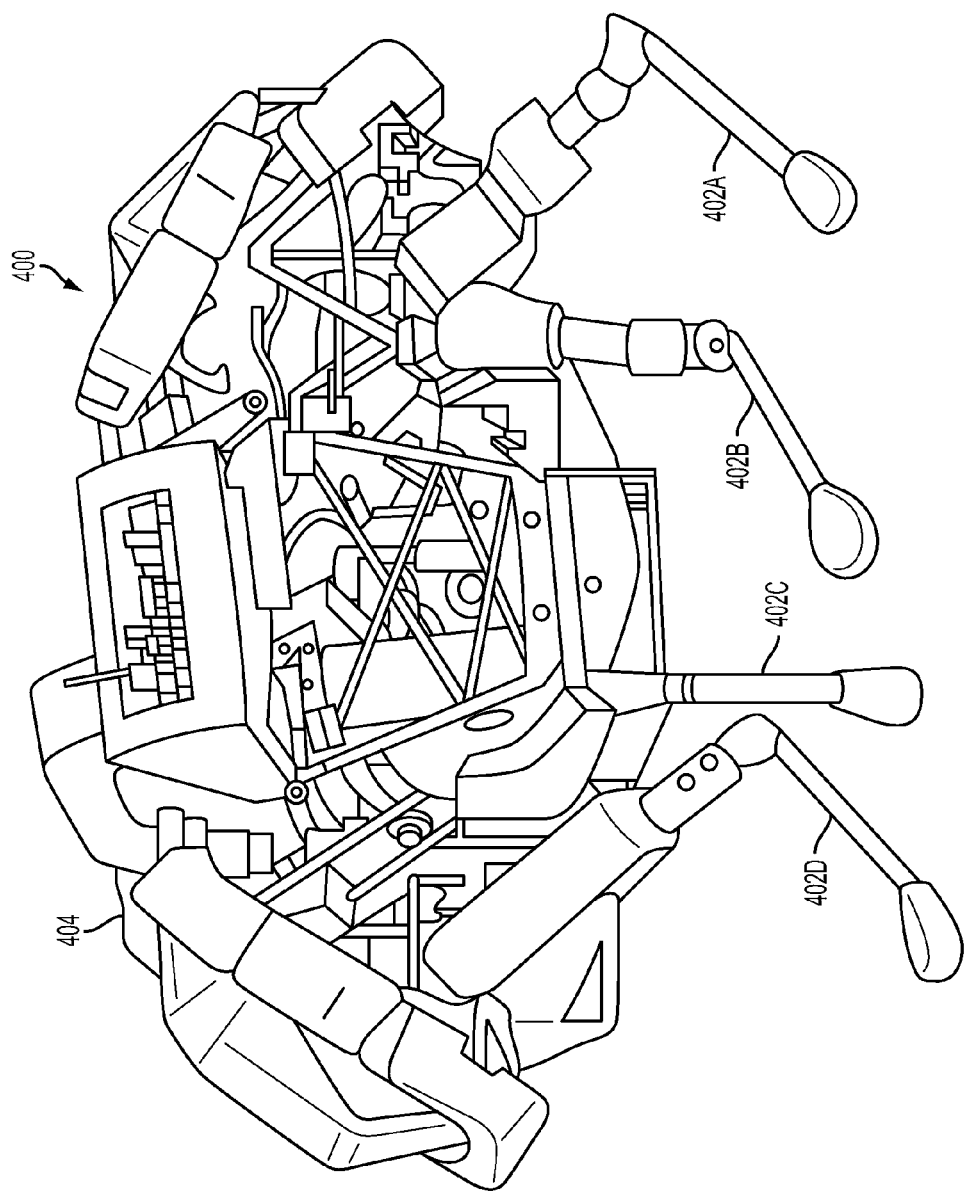
FIG. 4 illustrates a robotic device 400, in accordance with an example embodiment.

FIG. 4 illustrates a robotic device 400, in accordance with an example embodiment. The robotic device 400 mimics motion of a four-legged animal. The robotic device 400 includes leg 402A, leg 402B, leg 402C, and leg 402D connected to a body 404 of the robotic device 400 and may also include sensors configured to provide sensor data to a computing system (e.g., the supervisory controller 201) of the robotic device 400. Within other example implementations, the robotic device 400 may include more or less components and may include components not shown in FIG. 4.

The robotic device 400 is shown with the four extendable legs 402A-402D. The robotic device 400 may include more or less legs within other examples. Further, the configuration, position, and/or structure of the legs 402A-402D may vary in example implementations. The legs 402A-402D enable the robotic device 400 to move, and may be configured to operate in multiple degrees of freedom to enable different techniques of travel to be performed.

The robotic device 400 may communicate with one or multiple users and/or other robotic devices via various types of interfaces. In one example implementation, the robotic device 400 may receive input from a user via a joystick or similar type of interface. The computing system may be configured to receive, force, position, and velocity commands to actuators controlling the legs 402A-402D via inputs received from a joystick interface. Similarly, the robotic device 400 may receive inputs and communicate with a user via other types of interfaces, such as a mobile device. In other examples, the robotic device 400 may be autonomous and may be configured to control the legs 402A-402D to move in a particular manner and perform a particular task.

In an example, each leg of the four legs 402A-402D of the robotic device 400 may be controlled by a respective hydraulic actuator such as the hydraulic actuator 106. For instance a given hydraulic actuator may control a joint that connects a corresponding leg to the body 404. As a piston of the given hydraulic actuator extends and retracts, the joint rotates and the corresponding leg moves.

The legs 402A-402D may enable the robotic device 400 to travel at various speeds through mechanically controlling of the legs 402A-402D according to the mechanics of different gaits. A gait is a pattern of movement of the limbs of animal, robotic device, or other mechanical structure. The robotic device 400 may navigate by operating the legs 402A-402D to perform various gaits. Examples gaits include a walk, a trot, a gallop, a bound, a run, etc. The robotic device 400 may use a variety gaits to travel within an environment, which may involve selecting a gait based on speed, terrain, the need to maneuver, and/or energy efficiency. The robotic device 400 may be configured to switch between gaits.

In an example, based on state of a leg of the legs 402A-402D, some components of the control system shown in FIG. 3 may be active and others may not be active. For instance, in the position shown in FIG. 4 for the robotic device 400, the leg 402D may be touching the ground and may be referred to as being in a "stance" mode. The leg 402A does not touch the ground, and is swinging in the air. The leg 402A may be referred to as being in a "swinging" mode. As an example for illustration, while the leg 402D leg is in a "stance" mode, the integral block 312, the gain block 314, the feedforward gain block 322, and the gain block 320 of the control system controlling the actuator that controls the leg 402A may be inactive, while the rest of the components may be active. While the leg 402A leg is in a "swinging" mode, the integral block 312, the gain block 314, and the gain block 324 may be inactive, while the rest of the components may be active. These examples are for illustration only, and other configurations are contemplated herein. Several other modes of operation of the legs 402A-402D are possible based on whether is the robotic device 400 is walking, trotting, galloping, bounding, running, etc. In each of these modes, the legs 402A-402D may go through different modes of operation. Components of the control system shown in FIG. 3 may be active or inactive based on a particular mode a given leg experiences at a given point in time.

Further, as described above with respect to FIG. 2, the command 335 may be modified by one or more of the velocity feedforward module 204, the actuator limit control module 206, and the pressure relief module 208, and the modified signal is provided to the valve 100. In an example, modifying the command 335 by the one or more of the velocity feedforward module 204, the actuator limit control module 206, and the pressure relief module 208 may include adding more components to, activating components of, and/or inactivating components of, the control system shown in FIG. 3. For example, the actuator limit control module 206 may be configured to add components to the control system shown in FIG. 3 to reduce or prevent impact when the piston 108 is close to a physical limit as described next at FIGS. 5-8.

IV. Example Methods

Figure 5:
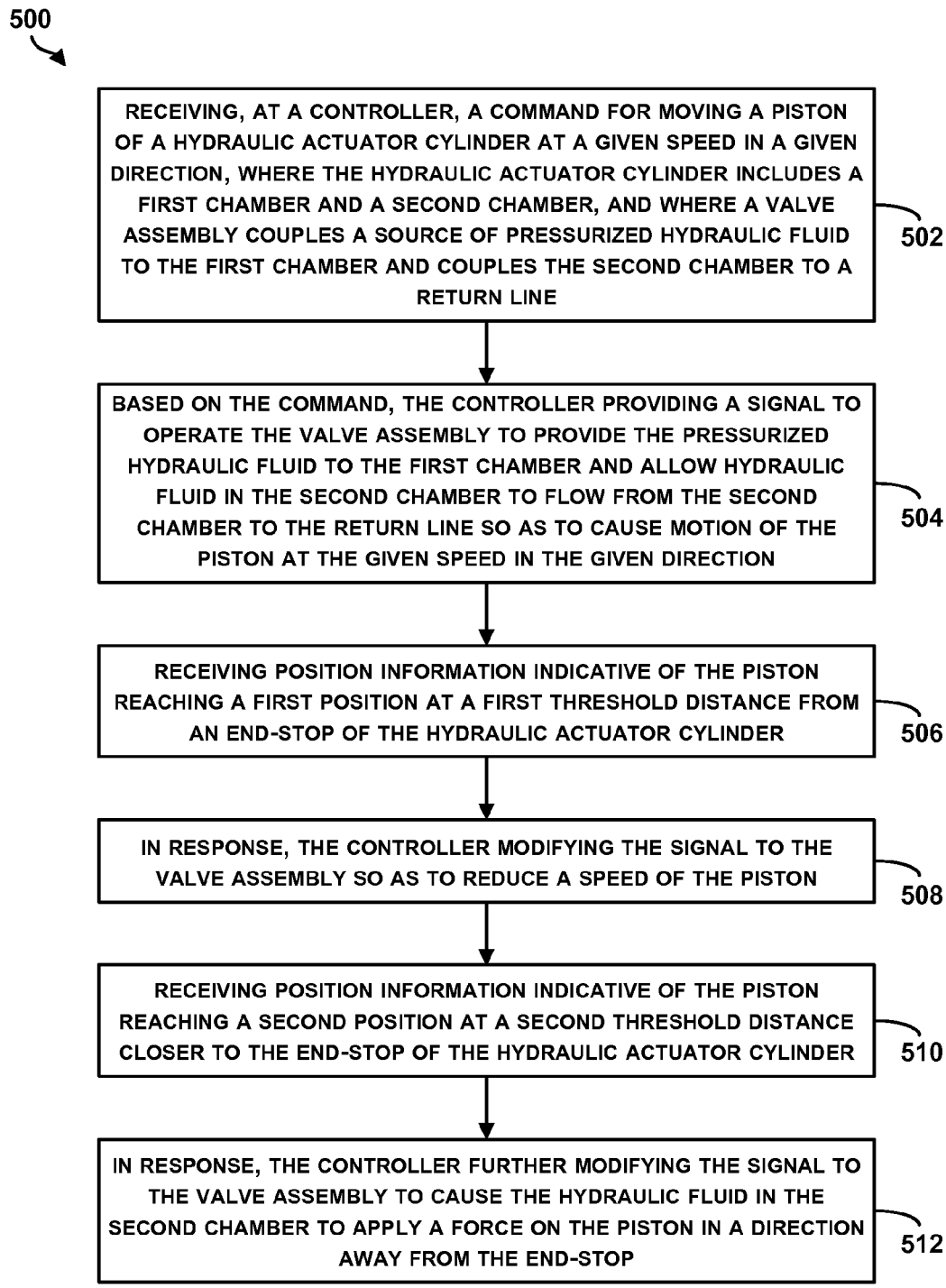
FIG. 5 is a flow chart of a method for controlling a hydraulic actuator, in accordance with an example embodiment.

FIG. 5 is a flow chart of a method 500 for controlling a hydraulic actuator, in accordance with an example embodiment. The method 500 may include one or more operations, functions, or actions as illustrated by one or more of blocks 502-512. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer-readable medium, for example, such as computer-readable media that stores data for short periods of time like register memory, processor cache and Random Access Memory (RAM). The computer-readable medium may also include non-transitory media or memory, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, a tangible storage device, or other article of manufacture, for example. The computer-readable medium, the processor, the program code may all be included within a controller of a hydraulic system or a valve. In addition, for the method 500 and other processes and methods disclosed herein, each block in FIG. 5 may represent circuitry that is wired to perform the specific logical functions in the process.

At block 502, the method 500 includes receiving, at a controller, a command for moving a piston of a hydraulic actuator at a given speed in a given direction, where the hydraulic actuator includes a first chamber and a second chamber, and where a valve assembly couples a source of pressurized hydraulic fluid to the first chamber and couples the second chamber to a return line.

The controller may be a computing device comprising one or more processors configured to execute program instructions stored in the computing device (e.g., a memory within the computing device), for example. The controller may be in communication with input devices such as a joystick or any other type of input devices.

In an example, a user of a hydraulic machine may provide a command through the input device to the controller. The controller, based on the command, provides control signals to a hydraulic system (e.g., pump, valves, actuators, tank, etc.) to move a hydraulic actuator, such as the hydraulic actuator 106 having the chambers 112 and 114. For instance, the command may involve instructions to move the piston 108 of hydraulic actuator 106 in a given direction at a given speed. In examples, the command may also specify a desired velocity for the piston 108 and a desired force to be exerted by the piston 108.

In another example, the command may be generated by an autonomous robotic device such as the robotic device 400 that includes a hydraulic system configured to control motion of the robotic device 400. The robotic device 400 may be configured to autonomously generate movement commands to execute a particular task. The movement commands may be provided to the controller of the hydraulic system. The controller may, for example, include the supervisory controller 201 described with respect to FIG. 2.

The valve assembly may include, for example, a valve such as the valve 100, but may also include any other valve configurations (e.g., spool valves, poppet valves, rotary valves, etc.). For example, the valve assembly may include at least four valves: a first valve that connects a pump to the chamber 112, a second valve that connects the pump to the chamber 114, a third valve that connects the chamber 112 to a tank or reservoir, and a fourth valve that connects the chamber 114 to the tank. Thus, the valve assembly may include one or more valves that control flow of fluid from a pressure source to the hydraulic actuator, and control flow of fluid forced out of the hydraulic actuator to a return line.

In examples, the pressure source may be a pump, and the return line may be connected to a reservoir or tank. However, in regenerative modes where chambers 112 and 114 of the hydraulic actuator 106 may be connected together through a supply line or a return line, the pressure source may be one of the chambers 112 or 114, and the return line may be a line connecting the chambers 112 and 114 together. For example, in a high-side regeneration mode the chambers 112 and 114 may be connected together through a high pressure supply line (i.e., a line connected to a pump). In this case, flow is supplied from the supply line to a first chamber of the chambers 112 and 114, and the flow forced out of the second chamber may be fed back or regenerated to the first chamber instead of flow back to a tank or reservoir. In this case, the return line is the line connecting the two chambers together as opposed to a line connecting the second chamber to the tank. Similarly, in another example, the hydraulic actuator 106 may be operating in a low-side regeneration mode, and the piston 108 may be retracting (moving left in FIG. 1 as the chamber 114 expands and the chamber 112 contracts) while being assisted with gravity. In this case, high pressure fluid from a pump may not be needed to move the piston 108. Fluid forced out of the chamber 112 may be routed back to the chamber 114 in a regenerative manner. In this case, the pressure source from a point of view of the chamber 114 is the chamber 112. The return line from chamber 112 may be a hydraulic line connecting the chamber 112 to the chamber 114.

At block 504, the method 500 includes, based on the command, the controller providing a signal to operate the valve assembly to provide the pressurized hydraulic fluid to the first chamber and allow hydraulic fluid in the second chamber to flow from the second chamber to the return line so as to cause motion of the piston at the given speed in the given direction. As described in FIGS. 1 and 2, based on a command to move the piston 108 of the actuator 106 in a given direction at a given speed, the controller, e.g., the position-force control module 202, may generate a signal to the valve 100. The signal may be provided to an electric actuator (e.g., motor, solenoid, rotary actuator, etc.) that actuates the valve 100 (e.g., moves the spool 102) to allow flow from the pressure source 110 to the hydraulic actuator 106, and allow flow forced out of the hydraulic actuator 106 to the reservoir 116. Specifically, referring to FIG. 1 as an example, flow is allowed through the opening 118 of the valve 100 to the chamber 114 pushing the piston 108 to the left. Also, fluid is forced out of the chamber 112 through the opening 120 of the valve 100 to the reservoir 116. However, as described above at FIG. 2, the signal generated by the position-force control module 202 may be modified by other modules. For example, the signal, or the control structure of the position-force control module 202, may be modified by the actuator limit control module 206 to reduce or prevent impact when the piston 108 is close to the end-stop 122 of the hydraulic actuator 106.

At block 506, the method 500 includes receiving position information indicative of the piston reaching a first position at a first threshold distance from an end-stop of the hydraulic actuator.

Figure 6:
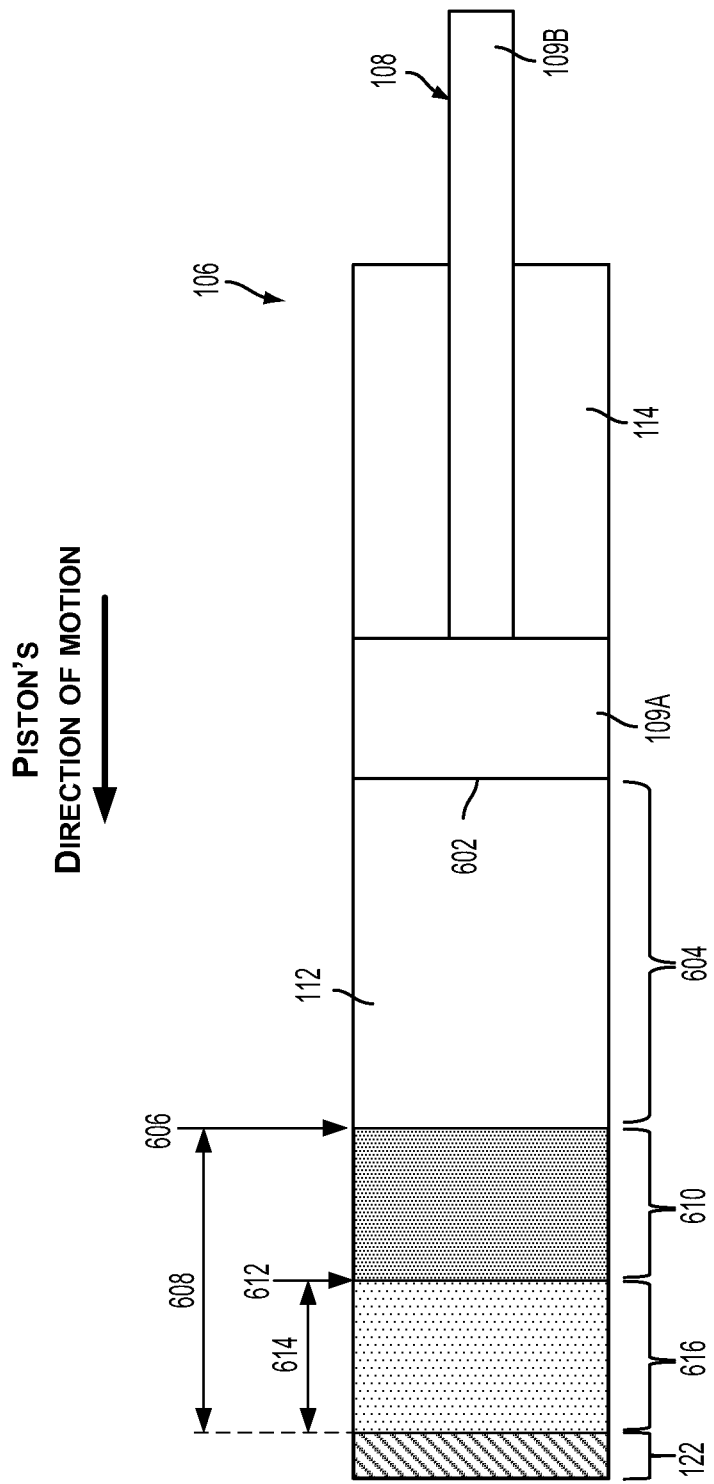
FIG. 6 illustrates actuator limit control for the hydraulic actuator, in accordance with an example embodiment.

FIG. 6 illustrates actuator limit control for the hydraulic actuator 106, in accordance with an example embodiment. As shown in FIG. 6, the piston 108 may be moving to the left. Thus, the chamber 114 is expanding, and the chamber 112 is contracting. A position sensor may be coupled to or embedded within the piston 108 (e.g., within the piston head 109A or the piston rod 109B). The position sensor may be configured to provide information indicative of a position of the piston 108 to the controller. In an example, the position sensor may indicate to the controller the position of a surface 602 of the piston head 109A within the chamber 112.

In an example, the signal generated by the position-force control module 202 may be used to control the valve without modification by the actuator limit control module 206 while the surface 602 is within region 604, i.e., before the surface 602 reaches a first position 606 at a first threshold distance 608 from the end-stop 122 of the hydraulic actuator 106. In examples, the first position 606 and the first threshold distance 608 may be based on a size and stroke length (e.g., distance that the piston 108 travels from one end of the hydraulic actuator 106 to the other end) of the hydraulic actuator 106. For example, if the stroke is 80 mm, the first threshold distance may be about 6 mm.

Referring back to FIG. 5, at block 508, the method 500 includes, in response, the controller modifying the signal to the valve assembly so as to reduce a speed of the piston. Upon the piston 108 (specifically, the surface 602) reaching the first position 606, the actuator limit control module 206 may modify the signal generated by the position-force control module 202 so as to reduce the speed of the piston 108. For instance, the actuator limit control module 206 may modify, supplement, or override the signal generated by the position-force control module 202 to "dampen" the motion of the piston 108 and slow it down.

Figure 7:
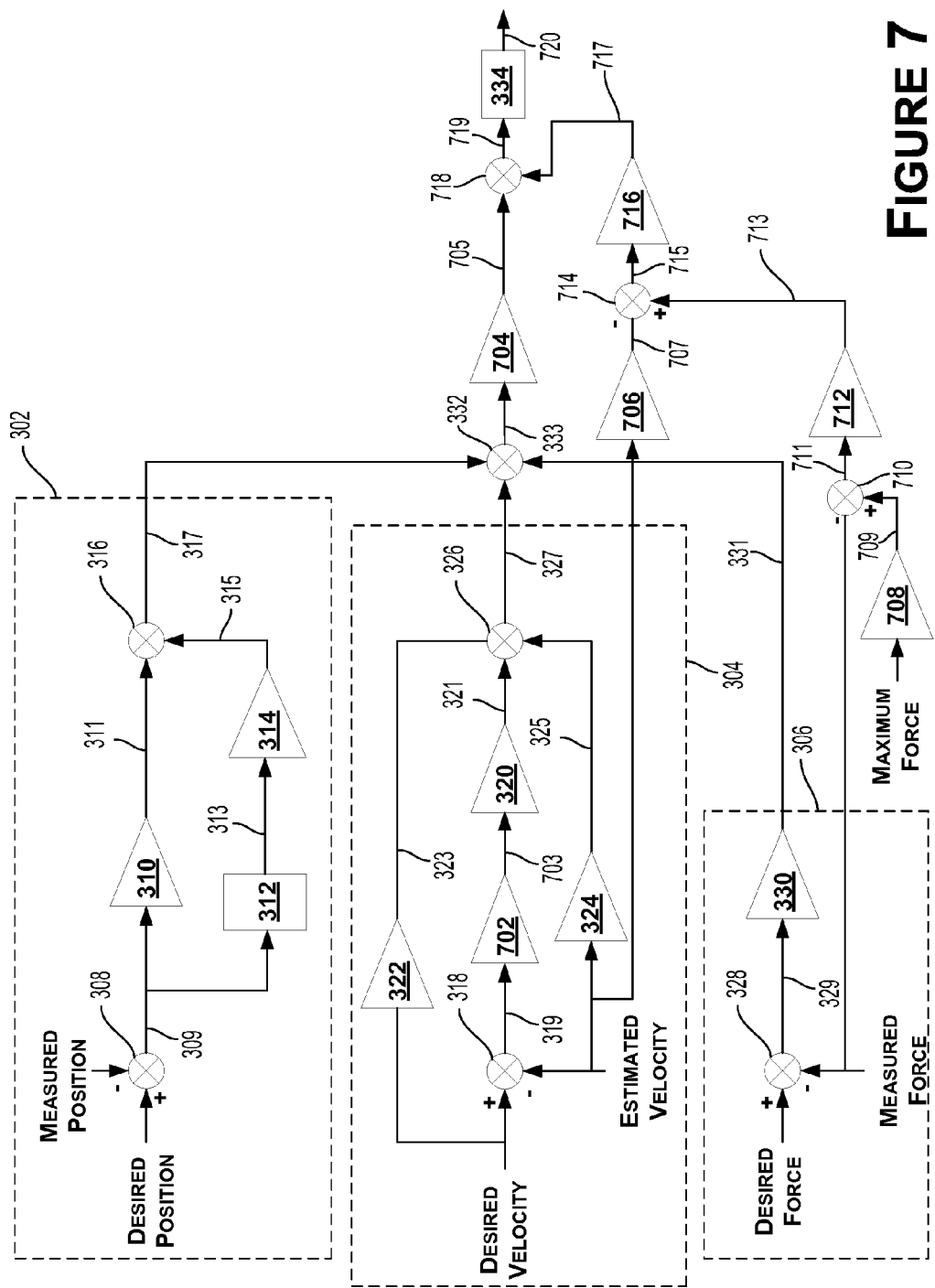
FIG. 7 illustrates modification of the position-force control system illustrated in FIG. 3, in accordance with an example embodiment.

FIG. 7 illustrates modification of the position-force control system illustrated in FIG. 3, in accordance with an example embodiment. To dampen the motion of the piston 108, a proportional gain 702 is added or activated to adjust the error signal 319. As an example for illustration, the proportional gain 702 may have a value of: $(1-w_d)$. $w_d$ may be referred to as a damping weight. The block 702 thus modifies the adjustment of the error signal 319 such that the error signal 319 is multiplied the proportional gain 702 to form signal 703, which is adjusted by the proportional gain 320. If the damping weight $w_d$ has a value that is between 0 and 1, the extent of adjustment of the error signal 319 is reduced, and thus the effect of velocity feedback is reduced. Reducing the velocity feedback decreases a portion of valve command that would push the piston 108 closer to the end-stop 122, and thus decreases the opening 118 of the valve 100 and reduces speed of the piston 108. Such reduction in velocity feedback thus dampens motion of the piston 018. In this manner, the piston 108 may still be moving towards the end-stop 122 to reach a particular commanded position close to the end-stop 122, but approaches the end-stop at a reduced speed.

In examples, the faster the piston 108 is moving toward the end-stop 122, the larger the modification implemented by the actuator limit control module 206 to the signal so as to slow down the piston 108 quicker. Such modification effectively simulates a force applied to the piston 108 in a direction away from the end-stop, where that force is based on the speed of the piston 108. Such modification or dampening of motion of the piston 108 continues while the surface 602 is within region 610 of the chamber 112 shown in FIG. 6.

Referring back to FIG. 5, at block 510, the method 500 includes receiving position information indicative of the piston reaching a second position at a second threshold distance closer to the end-stop of the hydraulic actuator. The position sensor coupled to the piston 108 may indicate to the controller that the surface 602 of the piston head 109A reached a second position 612 (shown in FIG. 6) at a second threshold distance 614 from the end-stop 122 of the hydraulic actuator 106. For example, if the stroke length is 80 mm and the first threshold distance may be about 6 mm, the second threshold distance may be about 4 mm. These numbers are examples for illustration only, and these distances may change based on characteristics of the hydraulic actuator 106 (size, stroke length, etc.).

At block 512, the method 500 includes, in response, the controller further modifying the signal to the valve assembly to cause the hydraulic fluid in the second chamber to apply a force on the piston in a direction away from the end-stop. The modification described at block 508 may be considered a first modification. The actuator limit control module 206 may be configured to make a second modification to the signal provided to the valve 100 upon the piston 108 (specifically, the surface 602) reaching the second position 612 so as to further reduce the speed of the piston 108. Such modification or dampening of motion of the piston 108 continues while the surface 602 is within region 616 of the chamber 112 shown in FIG. 6. As an example, the modified signal may change a position of the spool 102 to set a particular pressure level in the chamber 112 that applies a force on the piston 108 (specifically, applies the force on the surface 602) to oppose motion of the piston 108. In an example, the applied force may be a spring-like force (i.e., as if a spring is pushing against the surface 602 of the piston 108) such that the closer the surface 602 is to the end-stop 122, the larger the applied force that is pushing against the piston 108 is. In this manner, the applied force may be inversely proportional to the distance between the surface 602 and the end-stop 122. The piston 108 may therefore slow down further and the controller may prevent any shock forces to occur if the piston 108 reaches the end-stop 122.

Referring to FIG. 7, to make the second modification, the actuator limit control module 206 may further add or activate a proportional gain 704 to the control system illustrated in FIG. 3. As an example for illustration, the proportional gain 704 may have a value of: $(1-w_s)$. $w_s$ may be referred to as a spring weight. The proportional gain 704 modifies the signal 333 to form signal 705. If $w_s$ has a value that is between 0 and 1, the value of the signal 333 is reduced, and thus the effect of three control loops 302, 304, and 306 may be reduced.

The actuator limit control module 206 may further add or activate a proportional gain 706 to the control system illustrated in FIG. 3. The estimated (or measured) velocity is adjusted by the proportional gain 706 to form an adjusted signal 707.

The actuator limit control module 206 may further add or activate a proportional gain 708 to the control system illustrated in FIG. 3. In an example, the proportional gain 708 may have a value of $w_s$. The proportional gain 708 is multiplied by a maximum force that piston 108 is capable of exerting to form a signal 709. The maximum force can be determined, for example, by multiplying a supply pressure $P_S$ (maximum pressure from the pressure source 110) by the area that the pressure is acting on. For example, in the configuration shown in FIGS. 1 and 6, the supply pressure would be acting on the annulus area of the piston 108 in chamber 114. Thus, the maximum force may be determined by the following equation:

$$\text{Maximum Force} = P_S(A_C - A_{rod}) \quad (4)$$

As noted above with respect to equations (2) and (3), $A_C$ is the area of the piston head 109A in the chamber 112, and $A_{rod}$ is the cross section area of the rod 109B.

In another example, if the direction of motion of the piston 108 is reversed such that the chamber 112 is expanding and the chamber 114 is contracting, the maximum force can be determined by the following equation:

$$\text{Maximum Force} = P_S A_C \quad (5)$$

The measured force is subtracted from the signal 709 at junction 710 to form signal 711, which is further adjusted by a proportional gain 712 to form signal 713. The signal 707 is subtracted from the signal 713 at junction 714 to form signal 715, which is adjusted by a proportional gain 716 to form signal 717. The proportional gain 716, for example, has a value of $w_s$. The signal 717 and the signal 705 are summed at summation junction 718 to form signal 719. The signal 719 may or may not be modified by the slew rate limiter block 334 to generate the command to the valve a command 720 that is different from the command 335.

In an example, the weights $w_d$ and $w_s$ may have a constant value. However, in another example, the weights $w_d$ and $w_s$ may vary. For instance, the gains $w_d$ and $w_s$ may vary as the piston 108 approaches the end-stop 122.

Figure 8:
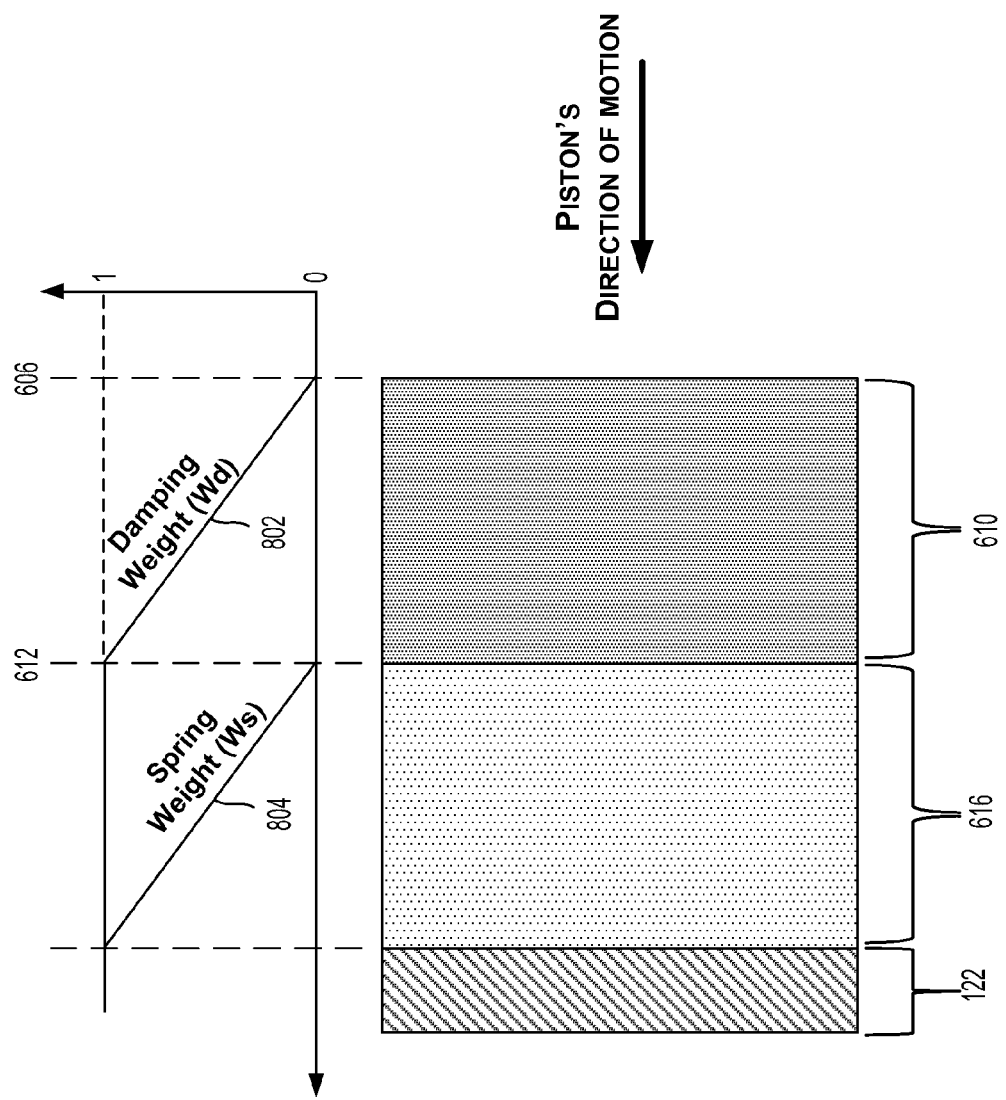
FIG. 8 illustrates variation of weights to phase-in actuator limit control, in accordance with an example embodiment.

FIG. 8 illustrates variation of the weights $w_d$ and $w_s$ to phase-in actuator limit control, in accordance with an example embodiment. As shown in FIG. 8, both gains have a value of zero before the surface 602 of the piston head 109A reaches the first position 606 (i.e., while the surface 602 is in the region 604). As the surface 602 reaches the first position 606 and moves further until the position 612 (i.e., while the surface 602 is within the region 610), the damping weight $w_d$ is ramped along line 802 from a value of zero to a value of 1, while the spring weight $w_s$ remains at a value of zero. In this manner, as the damping weight $w_d$ is ramped from zero to 1, the proportional gain 702 having a value of $(1-w_d)$ is decreased and a value of the error signal 319 is decreased gradually, and thus the effect of velocity feedback is decreased gradually, as well. Such decrease may result in dampening or reduction of the speed of motion of the piston 108. As the weight $w_d$ reaches the value of 1, the proportional gain 702 (having a value of $1-w_d$) reaches a value of zero, and thus velocity feedback may have no effect on the signal provided to the valve 100.

In the region 610, while $w_d$ ramps from zero to 1, weight $w_s$ has a value of zero, and the signal 717 has a value of zero because the proportional gain 716 has a value of $w_s$. Thus, the proportional gains 706, 708, and 712 will be ineffective (i.e., will not cause changes to the command to the valve 100). Similarly, the proportional gains 704 (having a value of $1-w_s$, which is equal to 1 when $w_s=0$), will not affect the signal 333.

As the surface 602 reaches the second position 612 and moves further toward the end-stop 122 (i.e., while the surface 602 is within the region 616), the damping weight $w_d$ maintains a value of 1, while the spring weights $w_s$ is ramped from a value of zero to a value of 1 along line 804. In this manner, the value of the proportional gain 702 remains at zero (velocity feedback remains ineffective or removed), and the spring-like force resulting from adding the proportional gains 704, 706, 708, 712, and 716 starts to be increasingly effective and pushes back on the piston 108 to slow it down further.

Specifically, as the spring weights $w_s$ increases from zero to 1, the proportional gain 704 decreases from a value of 1 to a value of zero, and thus the effect of the control loops 302, 304, and 306 is diminished. At the same time, the proportional gain 716 increases from zero to 1, and thus while the effect of the control loops 302, 304, and 306 diminishes, the proportional gains 706, 708, 712, and 716 take over (or dominate) determining the command 720 to the valve 100. As a result, in the region 616, the command to the valve 100 is based on the estimated (or measured) velocity, the measured force, and the maximum actuator force.

Further, contribution of the maximum force and the signal 715 in determining the command 720 to the valve 100 increases as the piston 108 progresses toward the end-stop 122 because respective values of the proportional gain 708 and the proportional gain 716 (both having a value of $w_s$) increase from zero to 1. Thus, the opposing force acting on the piston 108 increases as the piston 108 gets closer to the end-stop 122. For instance, as the piston 108 approaches the end-stop 122, the command 720 to the valve 100 may cause the opening 120 to be smaller (restricts the path from the chamber 112 to the reservoir) to increase pressure in the chamber 112 and slow down the piston 108. The result of this control structure is a force that opposes motion of the piston 108 toward the end-stop 122, and that increases in magnitude as the piston 108 approaches the end-stop 122 due to the increase in the proportional gains 708 and 716. The force is effectively a non-linear spring-like force opposing motion of the piston 108 toward the end-stop 122. In an example, modification to the valve command resulting from this control structure may cause the spool 102 may move in the other direction such that the pressure source 110 is connected to the chamber 112, and the chamber 114 is connected to the return line. In this manner, the fluid communicated from the pressure source 110 applies pressure on the piston 108 in a direction away from the end-stop 122 to slow the piston 108 down.

In an example, if the controller receives an input command to change direction of motion of the piston 108, even if the surface 602 is within the regions 610 or 616, the controller may stop any modifications to the signal provided to the valve 100. In this example, the proportional gains 702, 704, 706, 708, 712, and 716 may be deactivated and the position-force control system reverts back to the structure shown in FIG. 3.

In examples, a third region (not shown in FIGS. 6 and 8) in addition to the region 610 and the region 616 may be defined between the end of the region 616 and the end-stop 122. This third region may be referred to as a "safety" region in which both are both $w_d$ and $w_s$ equal 1. This third region may be defined, for example, by a third position (e.g., the end of the region 616) that is a third threshold distance from the end-stop 122. For example, if the stroke of the hydraulic actuator 106 is 80 mm, the third threshold distance may be 1 mm. In another example, if the stroke of the hydraulic actuator 106 is 45 mm, the third threshold distance may be 2 mm.

V. Separate Metering

In the example illustrated in FIG. 1, the valve 100 represents a spool valve where a linear position of the spool 102 determines both the opening 118 through which fluid flows from the pressure source 110 to the chamber 114 and the opening 120 through which fluid flows from the chamber 112 to the reservoir 116.

Figure 9A:
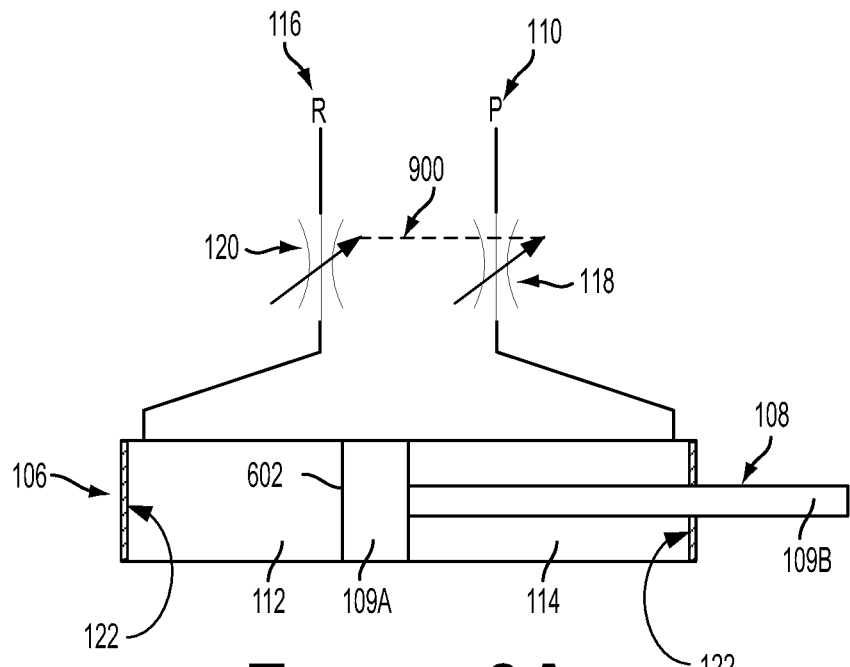
FIG. 9A illustrates mechanically coupled openings of a spool, in accordance with an example embodiment.

FIG. 9A illustrates mechanically coupled openings 118 and 120 of the spool 102, in accordance with an example embodiment. As the spool 102 (shown in FIG. 1) moves, the openings 118 and 120 change in size and can be represented by variable flow restrictions as shown in FIG. 9A. Because a given position of the spool 102 defines both the opening 118 and the opening 120, FIG. 9A shows the openings 118 and 120 mechanically coupled by a virtual link 900. Having such a link indicates that the openings 118 and 120 are not independent of each other, i.e., defining a size of one opening defines the size of the other as well. In this case, the valve 100 is a single degree-of-freedom (DOF) system because a command to the valve 100 determines a position of the spool 102, which defines both openings 118 and 120. The controller can control the position of the spool 102 to define a specific size of the opening 118, meter flow into the chamber 114, and control the speed of the piston 108. The controller can also define the size of the opening 118 to control pressure level in the chamber 114. For example, the controller may have information indicative of a supply pressure $P_s$ of fluid coming from the pressure source 110. The controller may also have information indicative of an amount of flow going through the opening 118. For instance, if a speed of the piston is V, the flow Q through the opening 118 can be estimate as:

$$Q = V(A_C - A_{rod}) \quad (6)$$

Referring back to equation (1), assuming that a desired pressure level for the chamber 114 is $P_R$, the variable K for the opening 118 can be determined as:

$$K = \frac{Q}{\sqrt{P_S - P_R}} \quad (7)$$

Once K is determine for the opening 118 is determined, the controller may provide a signal to the valve 100 to actuate the spool 102 to a position corresponding to a value of K for the opening 118.

However, the controller does not define a size of the opening 120 independently because of the mechanical coupling of the opening 118 and the opening 120, and thus, the controller may not, for example, control pressure level in the chamber 112 while controlling the speed of the piston 108 or the pressure level in the chamber 114.

Alternatively, the controller can control the position of the spool 102 to define a specific size of the opening 120 to control a pressure level in the chamber 112. For example, the controller may have information indicative of pressure $P_T$ in the return line leading to the tank or reservoir 116. The controller may also have information indicative of an amount of flow going through the opening 120. For instance, if a speed of the piston is V, the flow Q through the opening 12 can be estimate as:

$$Q = VA_C \quad (8)$$

Referring back to equation (1), assuming that a desired pressure level for the chamber 112 is $P_C$, the variable K for the opening 120 can be determined as:

$$K = \frac{Q}{\sqrt{P_C - P_T}} \quad (9)$$

Once K is determine for the opening 120 is determined, the controller may provide a signal to the valve 100 to actuate the spool 102 to a position corresponding to a value of K for the opening 120.

However, in this case, the controller does not independently define the opening 118 and may not control the amount of flow going to the chamber 114 (or the pressure level in the chamber 114). In this manner, the controller can control one of: (i) a speed of the piston 108, (ii) pressure in the chamber 114, or (iii) pressure in the chamber 112. To break the virtual link 900, two independent valves can be used instead of one spool valve.

Figure 9B:
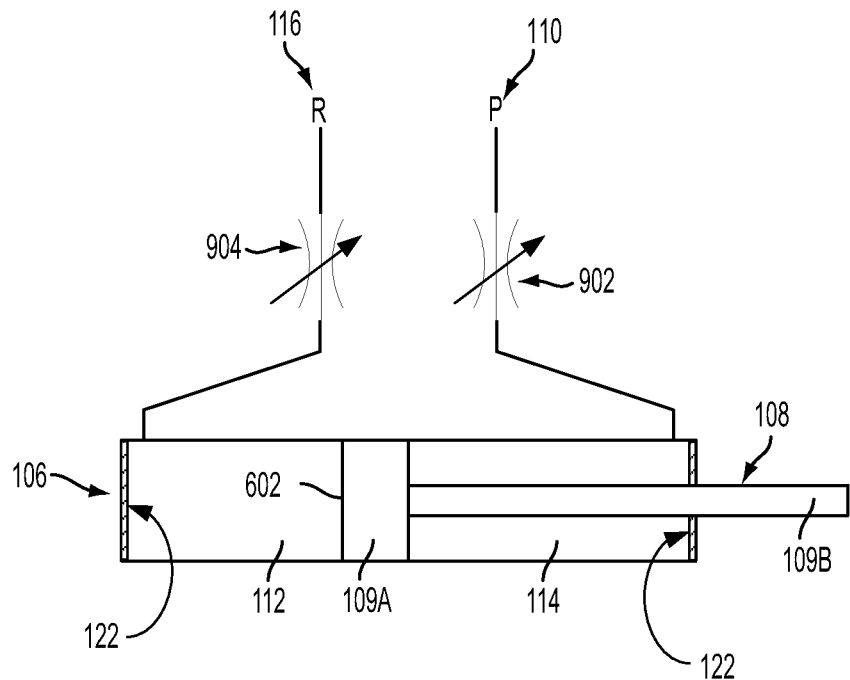
FIG. 9B illustrates separate metering, in accordance with an example embodiment.

FIG. 9B illustrates separate metering, in accordance with an example embodiment. FIG. 9B shows two separate or independent restrictions 902 and 904 that are not mechanically coupled. Two separate valves can be used to form the independent restrictions 902 and 904. One valve forms the restriction 902 to control flow from the pressure source 110 to the chamber 114, and a second valve form the restriction 904 to control flow from the chamber 112 to the reservoir 116. A third and a fourth valve may be used to control flow from the pressure source 110 to the chamber 112 and flow from the chamber 114 to the reservoir 116 if the piston 108 was moving in the other direction. In an example, all four valves can be combined or integrated in a valve assembly.

The controller may be configured to control the opening 902 independently from the opening 904. Assuming that a first valve controls the opening 902 and a second valve controls the opening 904, each of the first valve and the second valve may be controlled by a respective signal from the controller. The respective signals may be generated by respective control systems. For instance, a control system such as the control system illustrated in FIG. 7 may generate a signal for the first valve and another control system may generate a signal for the second valve. In this manner, the configuration in FIG. 9B is a two DOF system. The controller may provide a signal to the first valve defining the opening 902 to meter fluid into the chamber 114 and control the speed of the piston 108 or determine the pressure level in the chamber 114. Similarly, the controller may independently provide a signal to the second valve defining the opening 904 to determine pressure level in the chamber 112. This arrangement may provide for an enhanced control of actuator motion to prevent pressure or force shocks at end-stops. For example, the controller can control both the speed of the piston 108 (by controlling the opening 902 to meter a particular amount of fluid) and the pressure level in the contracting chamber 112. By controlling pressure in the chamber 112, the controller may effectively reduce speed of the piston 108 by applying an opposing force that is either based on the speed of the piston 108 (as described at block 508 of the method 500) and/or inversely proportional a distance between the surface 602 and the end-stop 122 (as described at block 512 of the method 500).

VI. Conclusion

It should be understood that arrangements described herein are for purposes of example only. As such, those skilled in the art will appreciate that other arrangements and other elements (e.g., machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving, at a controller, a command for moving a piston of a hydraulic actuator at a given speed in a given direction, wherein the hydraulic actuator includes a first chamber and a second chamber, and wherein a valve assembly couples a source of pressurized hydraulic fluid to the first chamber and couples the second chamber to a return line;
based on the command, the controller providing a signal to operate the valve assembly to provide the pressurized hydraulic fluid to the first chamber and allow hydraulic fluid in the second chamber to flow from the second chamber to the return line so as to cause motion of the piston at the given speed in the given direction;
receiving position information indicative of the piston reaching a first position at a first threshold distance from an end-stop of the hydraulic actuator;
in response, the controller modifying the signal to the valve assembly so as to reduce a speed of the piston;
receiving position information indicative of the piston reaching a second position at a second threshold distance closer to the end-stop of the hydraulic actuator; and
in response, the controller further modifying the signal to the valve assembly to cause the hydraulic fluid in the second chamber to apply a force on the piston in a direction away from the end-stop.

2. The method of claim 1, wherein providing the signal to the valve assembly so as to reduce a speed of the piston comprises providing the signal so as to apply a respective force on the piston in the direction away from the end-stop, and wherein the respective force is based on the speed of the piston.

3. The method of claim 2, wherein the respective force increases as the piston moves from the first position to the second position.

4. The method of claim 1, wherein further modifying the signal to apply the force on the piston in the direction away from the end-stop is based on a distance between the piston and the end-stop.

5. The method of claim 4, wherein the force increases as the distance between the piston and the end-stop decreases.

6. The method of claim 1, wherein the valve assembly includes a spool, wherein the signal provided to the valve assembly determines a given position of the spool, and wherein the given position of the spool is associated with respective sizes of a first opening through which the pressurized hydraulic fluid flows to the first chamber and a second opening through which the hydraulic fluid forced out of the second chamber to flow to the return line.

7. The method of claim 1, wherein the valve assembly includes at least a first valve coupling the first chamber to the source of pressurized hydraulic fluid and a second valve coupling the second chamber to the return line and controlled independently from the first valve, and wherein providing a signal to the valve assembly comprises providing a first signal to the first valve and a second signal to the second valve.

8. The method of claim 7, further comprising:
determining, by the first signal to the first valve, an amount of flow of the pressurized hydraulic fluid through the first valve into the first chamber, wherein the speed of the piston is based on the amount of flow.

9. The method of claim 7, further comprising:
determining, by the second signal to the second valve, a pressure level in the second chamber, wherein the force applied on the piston is based on the pressure level in the second chamber.

10. The method of claim 1, wherein a position sensor is coupled to the piston, and wherein receiving the position information comprises receiving the position information via the position sensor.

11. A non-transitory computer readable medium having stored thereon executable instructions that, upon execution by a controller, cause the controller to perform functions comprising:
receiving a command for moving a piston of a hydraulic actuator at a given speed in a given direction, wherein the hydraulic actuator includes a first chamber and a second chamber;
based on the command, providing a signal to operate a valve assembly that controls flow of hydraulic fluid to the first chamber and controls flow of hydraulic fluid out of the second chamber so as to cause motion of the piston at the given speed in the given direction;
receiving position information indicative of the piston reaching a first position at a first threshold distance from an end-stop of the hydraulic actuator;
in response, making a first modification to the signal to the valve assembly so as to reduce a speed of the piston;
receiving position information indicative of the piston reaching a second position at a second threshold distance closer to the end-stop of the hydraulic actuator; and
in response, making a second modification to the signal to the valve assembly to cause the hydraulic fluid within the second chamber to apply a force on the piston in a direction away from the end-stop.

12. The non-transitory computer readable medium of claim 11, wherein function of providing the signal to the valve assembly so as to reduce a speed of the piston comprises defining a pressure level in the second chamber so as to apply a respective force on the piston in the direction away from the end-stop, and wherein the respective force is based on the speed of the piston.

13. The non-transitory computer readable medium of claim 12, wherein the respective force increases as the piston moves from the first position to the second position.

14. The non-transitory computer readable medium of claim 11, wherein the force applied on the piston in the direction away from the end-stop is based on a distance between the piston and the end-stop.

15. The non-transitory computer readable medium of claim 14, wherein the force increases as the distance between the piston and the end-stop decreases.

16. A system comprising:
a source of pressurized hydraulic fluid;
a return line;
a hydraulic actuator cylinder having a piston slidably accommodated in the hydraulic actuator cylinder, the piston including a piston head and a rod extending from the piston head along a central axis direction, and an inside of the hydraulic actuator cylinder being divided into a first chamber and a second chamber by the piston head;
a valve assembly that couples the source of pressurized hydraulic fluid to the first chamber and couples the second chamber to the return line;
at least one processor; and
a memory having stored thereon executable instructions that, upon execution by the at least one processor, cause the at least one processor to perform functions comprising:
receiving a command for moving the piston at a given speed in a given direction;
based on the command, providing a signal to operate the valve assembly to provide the pressurized hydraulic fluid to the first chamber and allow hydraulic fluid in the second chamber to flow from the second chamber to the return line so as to cause motion of the piston at the given speed in the given direction;
receiving position information indicative of the piston reaching a first position at a first threshold distance from an end-stop of the hydraulic actuator cylinder;
in response, making a first modification to the signal to the valve assembly so as to apply a first force on the piston in a direction away from the end-stop so as to reduce a speed of the piston;
receiving position information indicative of the piston reaching a second position at a second threshold distance closer to the end-stop of the hydraulic actuator cylinder; and
in response, making a second modification to the signal to the valve assembly so as to apply a second force on the piston in the direction away from the end-stop so as to further reduce the speed of the piston.

17. The system of claim 16, wherein the function of making the first modification to the signal to the valve assembly is based on the speed of the piston between the first position and the second position.

18. The system of claim 16, wherein the function of making the second modification to the signal to the valve assembly so as to apply the second force on the piston is based on a distance between the piston head and the end-stop while the piston head is between the second position and the end-stop.

19. The system of claim 16, wherein the valve assembly includes at least a first valve coupling the first chamber to the source of pressurized hydraulic fluid and a second valve coupling the second chamber to the return line and controlled independently from the first valve, wherein the function of providing the signal to the valve assembly comprises providing a first signal to the first valve and a second signal to the second valve, and wherein the functions further comprise:
causing, by the first signal to the first valve, a particular amount of flow of the pressurized hydraulic fluid through the first valve into the first chamber, wherein the speed of the piston is based on the particular amount of flow; and
causing, by the second signal to the second valve, the hydraulic fluid in the second chamber to have a particular pressure level, wherein the force applied on the piston is based on the particular pressure level of the hydraulic fluid in the second chamber.

20. The system of claim 16, further comprising:
a position sensor for detecting a position of the piston, the position sensor being coupled to the piston head or rod, wherein the function of receiving position information comprises receiving the position information from the position sensor.

* * * * *